United States Patent
Kwa et al.

(10) Patent No.: US 7,979,234 B2
(45) Date of Patent: *Jul. 12, 2011

(54) METHOD AND SYSTEM FOR DETERMINISTIC THROTTLING FOR THERMAL MANAGEMENT

(75) Inventors: Seh W. Kwa, San Jose, CA (US); Animesh Mishra, Pleasanton, CA (US); Naveen Cherukuri, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 216 days.

This patent is subject to a terminal disclaimer.

(21) Appl. No.: 12/348,532

(22) Filed: Jan. 5, 2009

(65) Prior Publication Data

US 2009/0119521 A1  May 7, 2009

Related U.S. Application Data

(63) Continuation of application No. 11/166,646, filed on Jun. 23, 2005, now Pat. No. 7,493,228.

(51) Int. Cl.
*G01K 1/00* (2006.01)

(52) U.S. Cl. .................. 702/130; 702/132

(58) Field of Classification Search .......... 702/130, 702/132
See application file for complete search history.

(56) References Cited

U.S. PATENT DOCUMENTS

| 6,535,798 | B1* | 3/2003 | Bhatia et al. ............ 700/293 |
| 2006/0018265 | A1* | 1/2006 | Frodsham et al. ......... 370/249 |
| 2006/0020861 | A1* | 1/2006 | Frodsham et al. ......... 714/724 |
| 2006/0168379 | A1 | 7/2006 | Frodsham et al. |

OTHER PUBLICATIONS

Office Action for U.S. Appl. No. 11/166,646 mailed Jun. 26, 2008, 8 pgs.
Notice of Allowance for U.S. Appl. No. 11/166,646 mailed Oct. 8, 2008, 13 pgs.

* cited by examiner

*Primary Examiner* — Drew A Dunn
*Assistant Examiner* — Stephen J Cherry
(74) *Attorney, Agent, or Firm* — Blakely, Sokoloff, Taylor & Zafman LLP

(57) ABSTRACT

A scheme to facilitate deterministic thermal management by having either device connected via a link to generate a thermal management request based on one device's thermal capability and the present conditions. The request is transmitted over the link to the other device with a specific sleep period. Consequently, the receiving device responds with an acknowledgement within a pre-configured or pre-agreed response time.

7 Claims, 5 Drawing Sheets

METHOD AND SYSTEM FOR DETERMINISTIC THROTTLING FOR THERMAL MANAGEMENT

RELATED APPLICATIONS

This application is a continuation of U.S. patent application Ser. No. 11/166,646 filed Jun. 23, 2005 now U.S. Pat. No. 7,493,228.

BACKGROUND OF THE INVENTION

1. Field of the Invention

The present invention relates to thermal management, specifically, deterministic throttling for serial interconnect technology.

2. Description of the Related Art

As mobile PC platforms increase performance and become feature-rich, thermal cooling of the platforms becomes increasingly challenging while sustaining or reducing its form factors and cost. Present thermal management solutions fail to offer a predictable and deterministic scheme. Therefore, the components suffer a performance loss because of over-conservativeness or risking reliability and quality issues because of under-estimation.

BRIEF DESCRIPTION OF THE SEVERAL VIEWS OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION OF THE INVENTION

In the following description, for purposes of explanation, numerous details are set forth in order to provide a thorough understanding of the present invention. However, it will be apparent to one skilled in the art that these specific details are not required in order to practice the present invention.

An area of current technological development relates to thermal management. As previously described, the existing solutions result in performance loss for the relevant components because of over-conservativeness or risking reliability and quality issues because of under-estimation.

Figure 3:
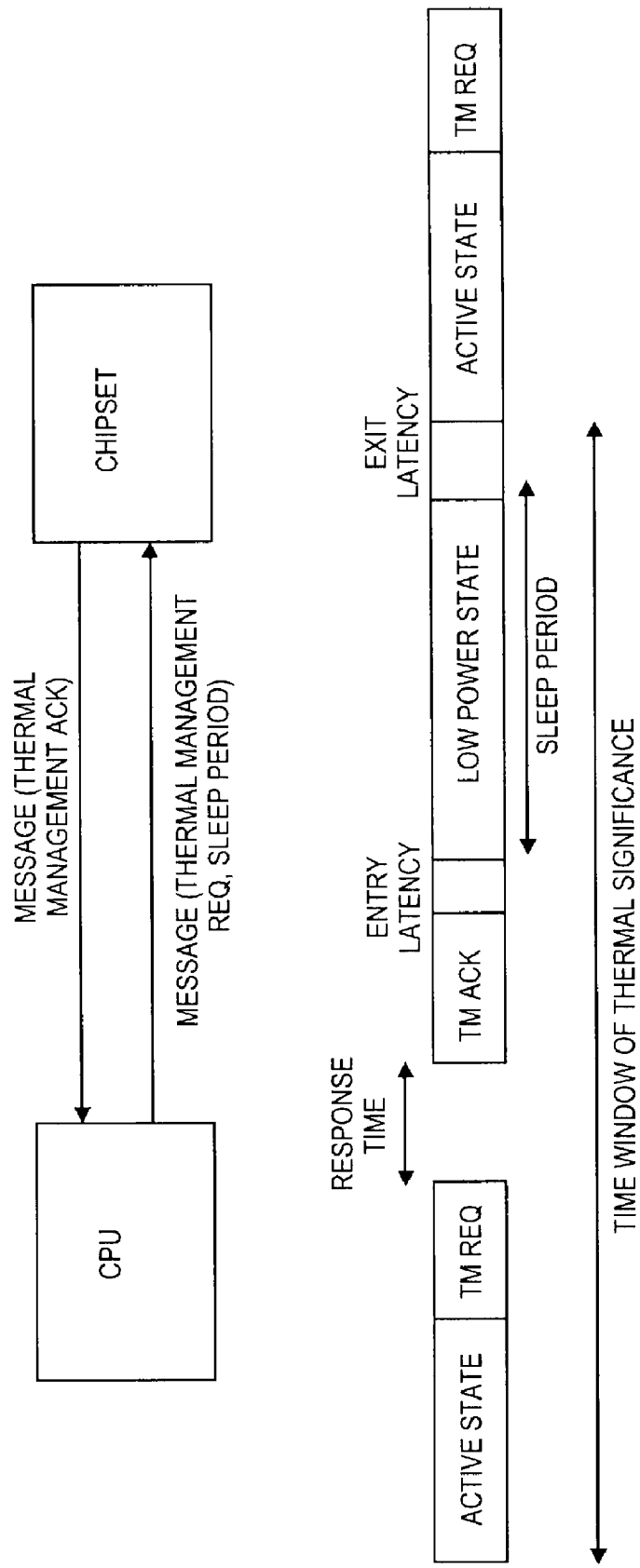
FIG. 3 is a block diagram as utilized by one embodiment of the claimed subject matter.
Figure 4:
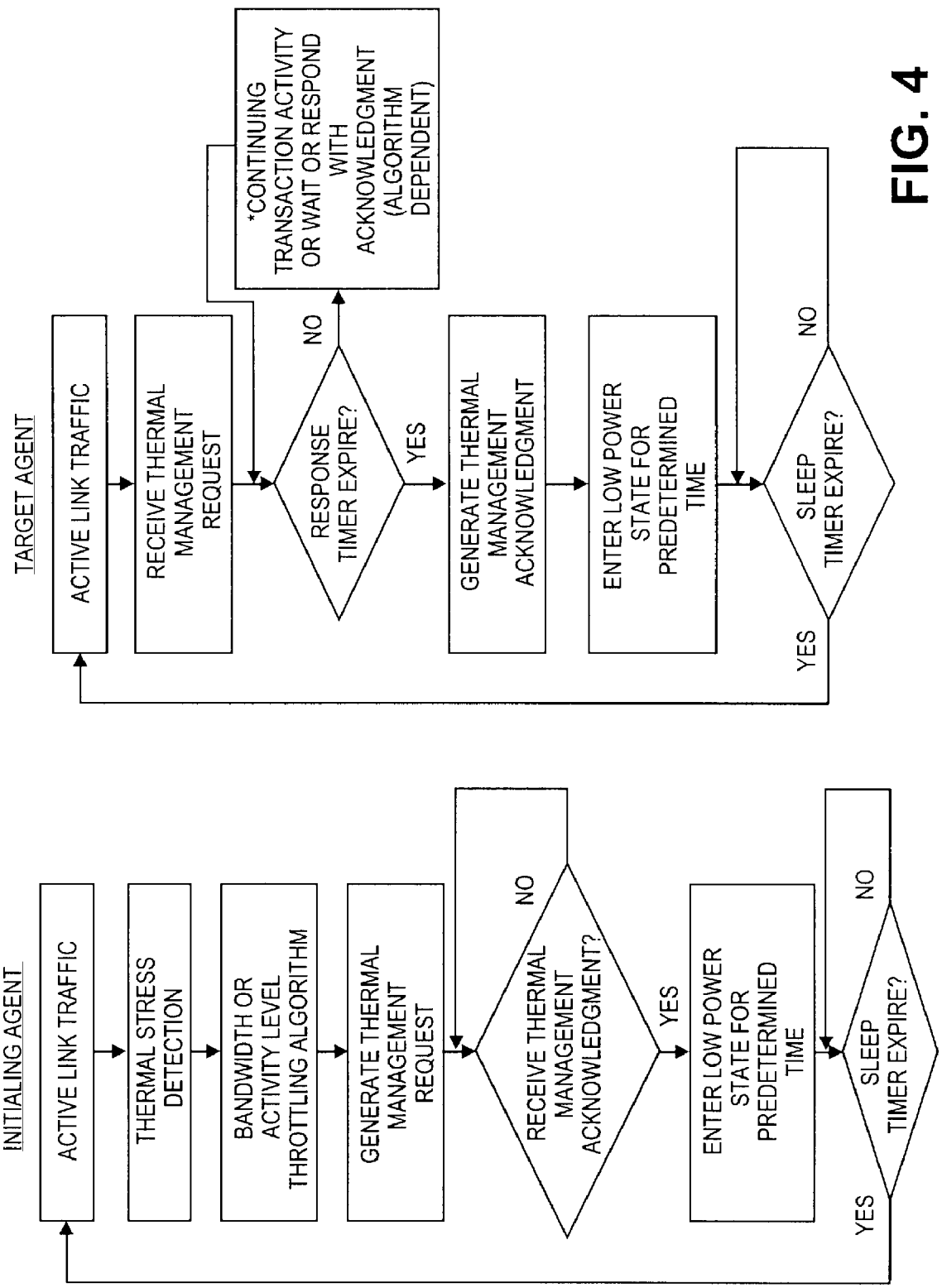
FIG. 4 is a flowchart for a method of thermal management for two agents connected via a serial link as utilized by one embodiment of the claimed subject matter.

In contrast, a method and a system are proposed that facilitates deterministic thermal management by having either device connected via a link to generate a thermal management request based on the device's thermal capability and the present conditions. The request is transmitted over the link to the other device with a specific sleep period. Consequently, the receiving device responds with an acknowledgement within a pre-configured or pre-agreed response time. An example of the preceding thermal management request and response is depicted in FIGS. 3 and 4.

The claimed subject matter facilitates exchanging latency information via a link initialization process. In another embodiment, latency information may be exchanged in a variety of methods, such as, via an operating system, BIOS, a power management module values hardwired into silicon by design, or latencies set by pin straps (each agent supports a small # of values and we choose value/value pair based on some encoding on a few pinouts)

Figure 1:
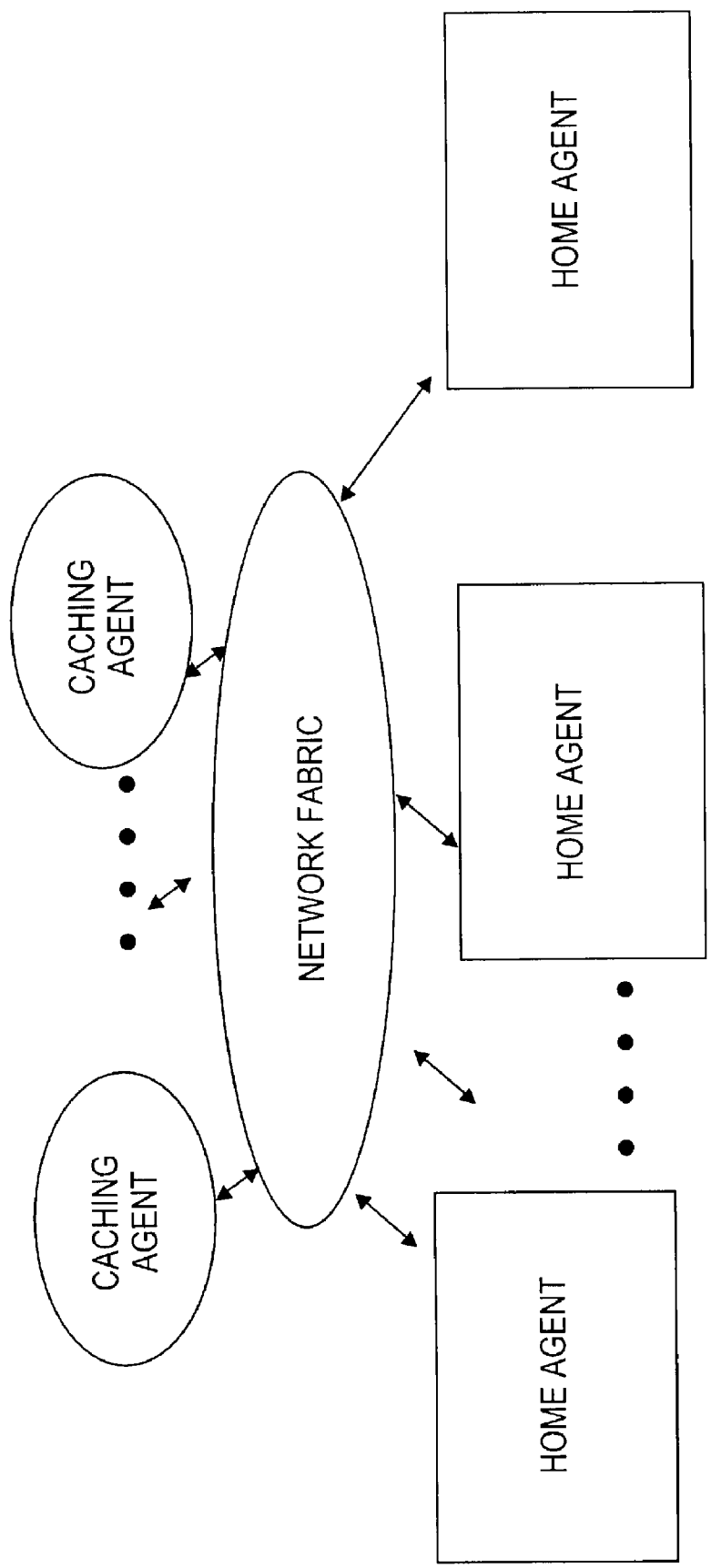
FIG. 1 is a protocol architecture as utilized by one embodiment.

In one embodiment, the point-to-point (pTp) architecture is defined by Intel's Common System Interface (CSI) and supports a layered protocol scheme, FIG. 1 illustrates one example of a cache coherence protocol's abstract view of the underlying network. In one embodiment, the claimed subject matter may be utilized for an architecture that depicts a plurality of caching agents and home agents coupled to a network fabric (see FIG. 1). For example, the network fabric adheres to a layered protocol scheme and may comprise either or all of: a link layer, a physical layer, a protocol layer, a routing layer, a transport layer. The fabric facilitates transporting messages from one protocol (home or caching agent) to another protocol for a point to point network. In one aspect, the figure depicts a cache coherence protocol's abstract view of the underlying network.

FIG. 1 is a protocol architecture as utilized by one embodiment. The architecture depicts a plurality of caching agents and home agents coupled to a network fabric. For example, the network fabric adheres to a layered protocol scheme and may comprise either or all of: a link layer, a physical layer, a protocol layer, a routing layer, a transport layer. The fabric facilitates transporting messages from one protocol (home or caching agent) to another protocol for a point to point network. In one aspect, the figure depicts a cache coherence protocol's abstract view of the underlying network.

Figure 2:
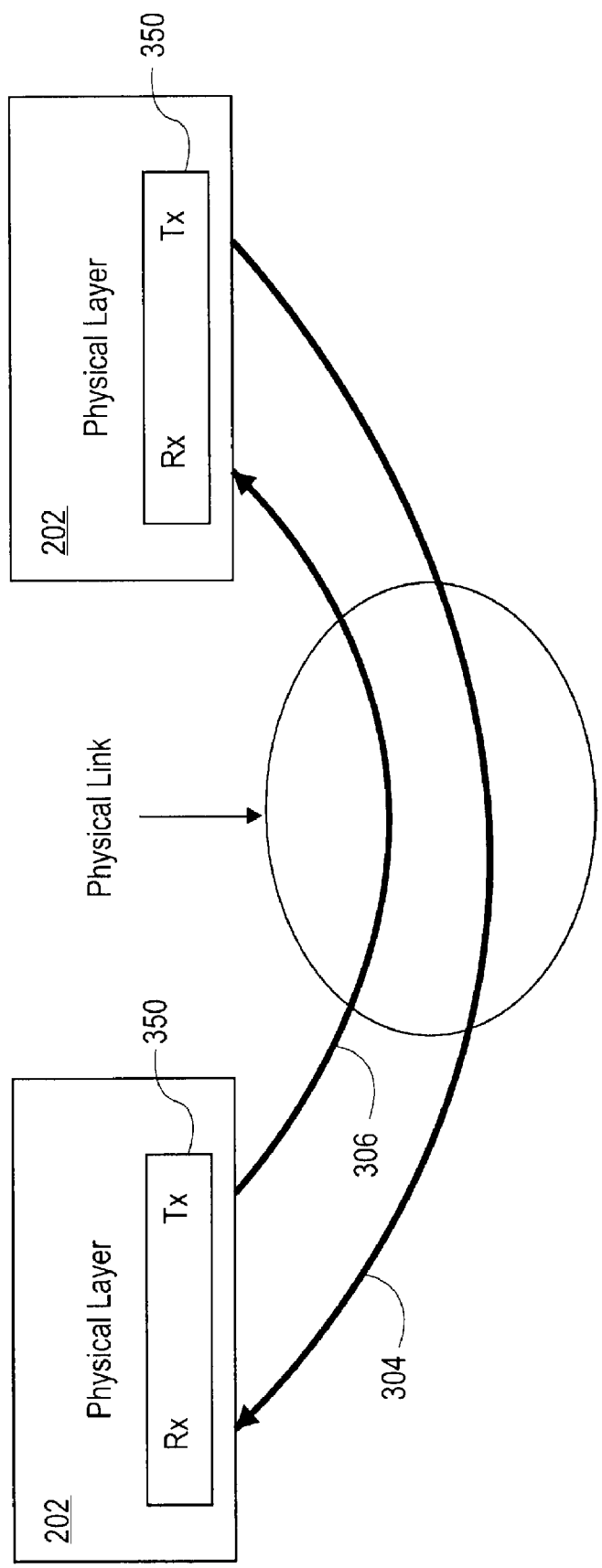
FIG. 2 is a block diagram of an apparatus for a physical interconnect utilized in accordance with the claimed subject matter.

FIG. 2 is a block diagram of an apparatus for a physical interconnect utilized in accordance with the claimed subject matter. In one aspect, the apparatus depicts a physical layer for a cache-coherent, link-based interconnect scheme for a processor, chipset, and/or IO bridge components. For example, the physical interconnect may be performed by each physical layer of an integrated device. Specifically, the physical layer provides communication between two ports over a physical interconnect comprising two uni-directional links. Specifically, one uni-directional link 304 from a first transmit port 350 of a first integrated device to a first receiver port 350 of a second integrated device. Likewise, a second unidirectional link 306 from a first transmit port 350 of the second integrated device to a first receiver port 350 of the first integrated device. However, the claimed subject matter is not limited to two uni-directional links. One skilled in the art appreciates the claimed subject matter supports any known signaling techniques, such as, bi-directional links, etc.

FIG. 3 is a block diagram as utilized by one embodiment of the claimed subject matter. In this embodiment, two components are connected via a link. In this embodiment, the link is similar to the one depicted earlier in connection with FIG. 2. As one example, two devices are connected via a link, wherein the first device is a central processor unit (CPU) and the second device is a Chipset. However, one skilled in the art appreciates the claimed subject matter is not limited to the preceding devices. For example, other devices, such as, DRAM, cache, peripherals, may be used. In order to clearly explain one example, the CPU will be the initiating agent and generates a thermal management request to the Chipset, wherein the chipset is the target agent.

In this embodiment, the CPU has reached a thermal threshold and requires a thermal management response. A thermal threshold may be an upper bound temperature that the integrated device would malfunction, predetermined operating frequency, thermal operating point, a measurement from an on die thermal sensor, etc. Thus, the CPU sends a thermal management request with a specific sleep period to the chipset via the communication link. The chipset may or may not be thermally stressed, nonetheless, it responds with an acknowledgment within an agreed response time. In response to receiving the acknowledgement, both components provide link inactivity by putting their respective transmitters into high impedance state which that enables the components to enter low power states upon noticing this link condition by their respective receivers.

In order to define the entry and exit latencies for the low power state for the components, in one embodiment, the sleep period, response time, entry and exit latencies are configured and exchanged during a link initialization process. One approach is to use a field in the request and ack/nak protocol. Another approach is to use BIOS to pre-program the entry and exit latencies. In another approach, a mechanism allows for a sideband pin to be used to define the latencies.

In one embodiment, the exit latency from the low power state is a function of resume time required for the power managed circuitry as well as the power delivery capability. In one embodiment, power delivery capability. is the ability to deliver an amount of current (I) on a voltage rail almost instantly to energize the proper functioning of required circuitry (and component). Thus, one aspect of power delivery is to deliver the voltage and current while minimizing and meeting the noise characteristic of that particular voltage rail.

Therefore, the timing parameters for the sleep period, the response time, the entry and exit latencies as well as transmitting the thermal management request and acknowledgement messages are accountable and deterministic.

A typical problem arises for power state selection since a natural conflict arises between the need to balance the level of power management in shutting down more circuitry versus the penalty of longer exit latency. The following flowcharts, FIG. 4, depicts an algorithm that gives the target agent a degree of freedom in determining the appropriate time of responding with an acknowledgement.

FIG. 4 is a flowchart for a method of thermal management for two agents connected via a serial link as utilized by one embodiment of the claimed subject matter. As discussed earlier in the example, the CPU is the initiating agent and the chipset is the target agent. Likewise, as previously discussed, the claimed subject matter is not limited to the preceding devices for initiating agents and target agents, since a RAM memory, or cache, between 2 processors, or any peripheral device may be used.

In this embodiment, the initiating agent has active link traffic but detects a thermal threshold (referred to as "thermal stress detection."). As previously discussed, a thermal threshold may be an upper bound temperature that the integrated device would malfunction a predetermined operating frequency, thermal operating point, a measurement from an on die thermal sensor, etc. In one embodiment, a bandwidth throttling algorithm controls the bandwidth by reducing the number of lanes available for data traffic. In another embodiment, the throttling algorithm manages the amount of request and completion packets to process. In yet another embodiment, the entry and exit of low power states. In still another embodiment, a bandwidth utilization counter is used to determine the target's choice of acknowledgement response.

Consequently, the initiating agent generates a thermal management request to the target agent over the link and waits for the acknowledgement from the target agent. The generation of the acknowledgment from the target agent is discussed in the next paragraph. Upon receiving the acknowledgment, the target agent enters a low power state for a predetermined time until a sleep timer expires.

For the target agent's acknowledgement, it eventually receives the thermal management request from the initiating agent over the link. Based on a response timer value, the target agent has a degree of freedom in determining the appropriate time of responding with an acknowledgement. For example, a power optimized approach would require the target agent to respond immediately whereas a performance oriented approach would look at the current or pending transactions for opportunity to complete one or more transactions within the agreed response time before submitting the acknowledgement to enter into low power state.

Figure 5:
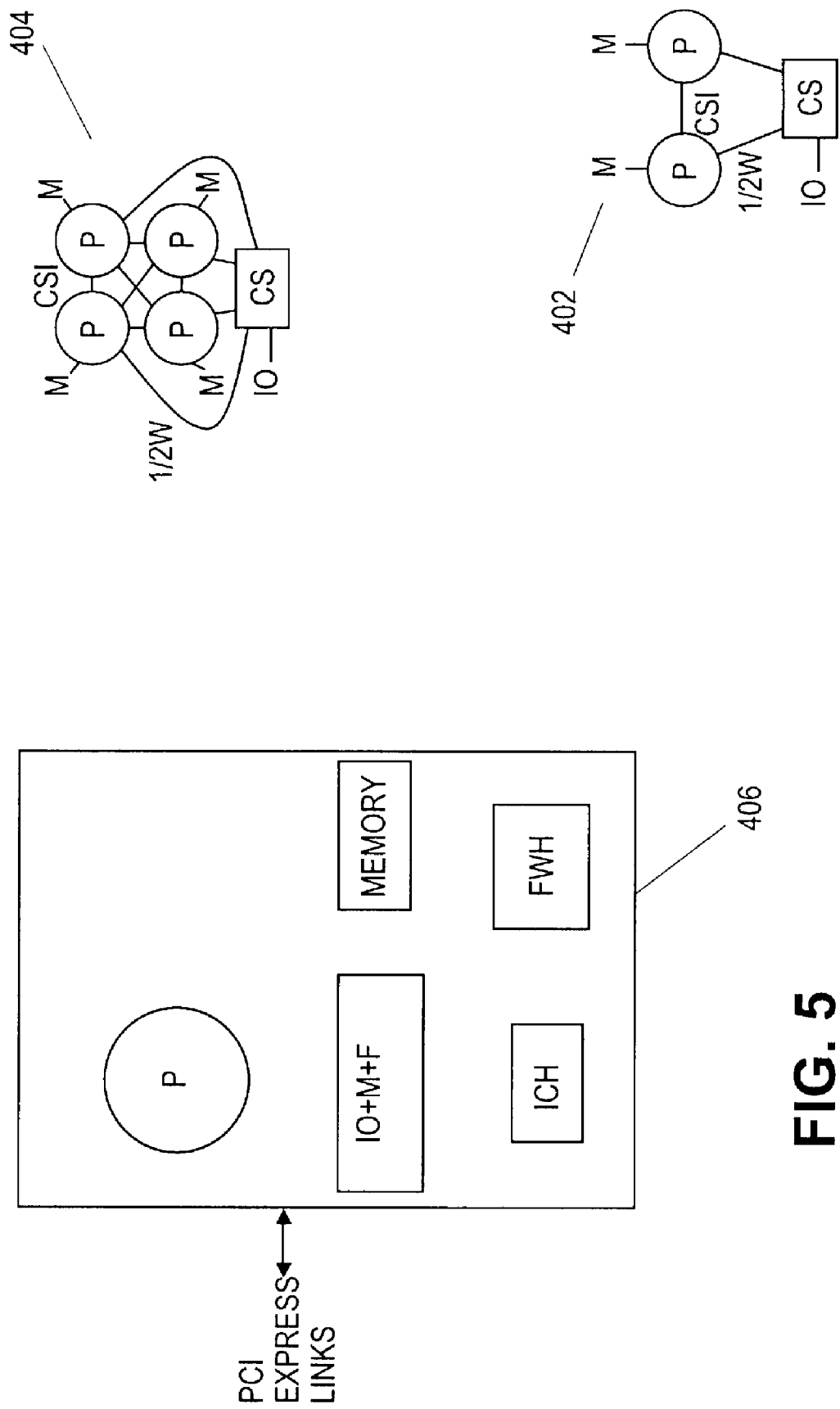
FIG. 5 is multiple embodiments of a system as utilized by multiple embodiments.

FIG. 5 depicts a point to point system with one or more processors. The claimed subject matter comprises several embodiments, one with one processor 406, one with two processors (P) 402 and one with four processors (P) 404. In embodiments 402 and 404, each processor is coupled to a memory (M) and is connected to each processor via a network fabric may comprise either or all of: a link layer, a protocol layer, a routing layer, a transport layer, and a physical layer. The fabric facilitates transporting messages from one protocol (home or caching agent) to another protocol for a point to point network. As previously described, the system of a network fabric supports any of the embodiments depicted in connection with FIGS. 1-3.

For embodiment 406, the uni-processor P is coupled to graphics and memory control, depicted as IO+M+F, via a network fabric link that corresponds to a layered protocol scheme. The graphics and memory control is coupled to memory and is capable of receiving and transmitting via PCI Express Links. Likewise, the graphics and memory control is coupled to the ICH. Furthermore, the ICH is coupled to a firmware hub (FWH) via a LPC bus. Also, for a different uni-processor embodiment, the processor would have external network fabric links. The processor may have multiple cores with split or shared caches with each core coupled to a Xbar router and a non-routing global links interface. Thus, the external network fabric links are coupled to the Xbar router and a non-routing global links interface.

Also, the claimed subject matter depicted in the previous Figures and Tables may be implemented in software. For example, the software may be stored in an electronically-accessible medium that includes any mechanism that provides (i.e., stores and/or transmits) content (e.g., computer executable instructions) in a form readable by an electronic device (e.g., a computer, a personal digital assistant, a cellular telephone). For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals).

Although the claimed subject matter has been described with reference to specific embodiments, this description is not meant to be construed in a limiting sense. Various modifications of the disclosed embodiment, as well as alternative embodiments of the claimed subject matter, will become apparent to persons skilled in the art upon reference to the description of the claimed subject matter. It is contemplated, therefore, that such modifications can be made without departing from the spirit or scope of the claimed subject matter as defined in the appended claims.

The description and claims talk about exchanging latency information via link initialization process. This is one example, and we may want to provide other possible mechanisms too. Examples include, OS, BIOS, a power management module in h/w or s/w, values hardwired into silicon by design (e.g., for a given series of products) or latencies set by pin straps (each agent supports a small # of values and we choose value/value pair based on some encoding on a few pinouts)

The invention claimed is:

1. A method for deterministic thermal management for a target agent, the method comprising:
    the target agent to operate in a normal mode of operation with an active link traffic;
    the target agent to receive a thermal management request from an initiating agent based on the initiating agent detecting a thermal stress condition; and
    the target agent to respond with an acknowledgement to the thermal management request within a predetermined response time and then enter a low power state for a duration of a predetermined sleep timer.

2. The method for deterministic thermal management of claim 1 wherein the target agent is one of a RAM memory, cache, processor, or any peripheral device.

3. The method for deterministic thermal management of claim 1 wherein the target agent receives the acknowledgment within a predetermined response time.

4. The method for deterministic thermal management of claim 1 wherein the sleep timer and the response time are configured and exchanged during a link initialization process.

5. A system with at least one initiating agent and one target agent coupled via a link interconnect comprising:
    a memory, coupled via a point to point link to receive memory requests from the initiating agent or target agent;
    the target agent to operate in a normal mode of operation with an active link traffic over the point to point link;
    the target agent to receive a thermal management request from an initiating agent based on the initiating agent detecting a thermal stress condition; and
    the target agent to respond with an acknowledgement to the thermal management request within a predetermined response time and then enter a low power state for a duration of a predetermined sleep timer.

6. The system of claim 5 wherein the target agent is one of a RAM memory, cache, processor, or any peripheral device.

7. The system of claim 5 wherein the target agent receives the acknowledgment within a predetermined response time.

* * * * *